United States Patent [19]
Bessire

[11] Patent Number: 6,007,419
[45] Date of Patent: Dec. 28, 1999

[54] TRANSPORT AND STORAGE CONTAINER CLIMATE CONTROL

[76] Inventor: Kevin G Bessire, 309 E. 17th. St., Rupert, Id. 83350

[21] Appl. No.: 09/074,629

[22] Filed: May 7, 1998

[51] Int. Cl.⁶ ........................................... B60H 1/22
[52] U.S. Cl. ...................... 454/118; 126/343.5 A; 165/41; 404/111
[58] Field of Search ................... 454/88, 90, 91, 454/118; 165/41, 42, 43, 57, 54, 169; 126/343.5 R, 343.5 A; 404/110, 111

[56] References Cited

U.S. PATENT DOCUMENTS

| | | | |
|---|---|---|---|
| 2,159,406 | 5/1939 | Schwebs | 454/91 X |
| 3,844,203 | 10/1974 | Takahashi | 454/118 |
| 4,784,216 | 11/1988 | Bracegirdle et al. | 165/169 X |
| 4,979,431 | 12/1990 | Fujimoto et al. | 454/91 |
| 5,120,217 | 6/1992 | O'Brien et al. | 126/343.5 R X |

*Primary Examiner*—Harold Joyce
*Attorney, Agent, or Firm*—Joseph W. Holland

[57] ABSTRACT

A transport and storage container for goods including a system for maintaining goods contained in the transport container within a preselected temperature range. The container may include an exterior support shell having a plurality of support members attached to and extending from an upper surface of the exterior support shell. An interior shell is attached to and supported by the support members and is offset from the exterior support shell forming a passage between the exterior support shell and the structural wall. The container for transport and storage of goods also includes a climate control device pneumatically connected to the passage for effecting a transfer of a thermal potential from the climate control device through the passage and through the interior shell, to and through the goods.

20 Claims, 5 Drawing Sheets

TRANSPORT AND STORAGE CONTAINER CLIMATE CONTROL

BACKGROUND

1. Technical Field

This invention relates generally to transport and storage containers for shipped goods, and more specifically to a container including a system for maintaining goods within the container within a preselected temperature range.

2. Background of the Invention

A wide variety of containers are employed in the shipping and transport of goods. Among these are a variety of both open, closed and encloseable containers. Some containers may include a means for loading the container that includes a generally open top or upper side which may be encloseable following loading. Some containers may include a means for unloading freight following transport. In general these types of containers are referred to as self-unloading trailers. Self-unloaders may be manufactured in a variety of configurations.

One embodiment of the self-unloader includes a generally flat floor and a pair of upright wall panels extending from the floor. A reciprocating conveyor includes a plurality of load-supporting slats which are mounted on a conveyor frame for reciprocating movement relative to the frame. The conveyor system releaseably engages the load-supporting slats for reciprocating the load-supporting slats on a predetermined sequence for moving a load in an off-loading or on-loading direction.

Another embodiment of the self-unloader includes a generally flat bottom panel and a pair of sloped sides extending from the bottom to a pair of upright wall panels. The overall configuration presents a generally "V" shaped configuration. The sloping configuration of the trailer walls provide a means by which the load contained within the trailer will tend to continuously feed to the bottom panel of the trailer. The bottom panel of this self-unloader may include a continuous conveyor which extends the length of the bottom panel of the container. The continuous conveyor may include a continuous conveyor belt or a chain with sectioned belts which loop from the front to the rear of the unit. The conveyor may be driven by chains, sprockets and/or pulleys. The conveyor may vary in width depending on the application and material to be unloaded.

Oftentimes during the transport and/or storage of goods or materials, it is desirable to maintain the goods or materials at a preselected temperature, or within a preselected temperature range, within the transport and storage container. For instance, it may be desirable to maintain fresh perishable goods at a temperature that may be lower than ambient conditions. Similarly, it may be desirable to maintain goods, including bulk agricultural products, feed products, road base containing oil or asphaltic constituents, or bulk or waste products, at a temperature that may be higher than ambient conditions, particularly in frigid climates.

What is needed is a system for maintaining goods or materials at a preselected temperature or within a preselected temperature range within a transport and storage container.

What is also needed is a system for maintaining goods or materials at a preselected temperature, or within a preselected temperature range within a self-unloading transport and storage container.

SUMMARY OF THE INVENTION

According to the present invention, a transport and storage container for goods includes a system for maintaining goods contained in the transport container within a preselected temperature range.

The container for transport and storage of goods includes an exterior support shell having a plurality of support members attached to and extending from an upper surface of the exterior support shell. An interior shell is attached to and supported by the support members and is offset from the exterior support shell forming a passage between the exterior support shell and the structural wall. The support members may be arranged such that the passage is divided into a plurality of adjacent ducts formed within the passage, each of the ducts defining a distinct region within the passage. The interior shell is configured to include an interior load containing cavity. The exterior support shell may include an insulating layer attached to one surface, the insulation the exterior support shell. In one embodiment of the invention, the outer side of the exterior support shell is insulated.

The container for transport and storage of goods may include an enclosure member removably attachable to the container for covering an open side of the container. In one embodiment of the invention, the enclosure member is configured as an insulated tarp which may be secured over the top side opening of the container.

The container for transport and storage of goods also includes a climate control device pneumatically connected to the passage for effecting a transfer of a thermal potential from the climate control device through the passage and through the interior shell, and for transferring the thermal potential to and through the goods contained within the container for maintaining the goods within a predetermined temperature range during transport and storage.

In one embodiment of the invention, the climate control device includes an air circulation system pneumatically connected to the climate control device for circulating air from the climate control device, through the passage formed between the exterior support shell and the structural wall, the air circulation system also including a port for conducting air flow between the climate control device and the passage. The climate control device may be configured as a forced air heating unit in those instances where the concern is to maintain the goods at a temperature which is greater than ambient conditions. In those instances or for those applications where it may be advantageous to maintain the goods at a temperature which is lower than ambient conditions, the climate control device may be configured as a forced air cooling unit.

The climate control device may also be configured to include an air collection plenum pneumatically connected to the climate control device and the passage. The climate control device may also include a temperature sensing system operatively connected to an air flow diversion mechanism for diverting conditioned air to a portion of the passage wherein the temperature is outside the predetermined temperature range.

In one embodiment of the invention, conditioned air flows from a forced air heating unit, through an output, through the container, and is drawn into one or more intakes, typically located at an end of the container opposite to the end of the container at which the output for the forced air heating unit is located. The heated air is drawn into the intakes and is directed through the passage formed between the exterior support shell and the interior shell. A transfer of a thermal potential from the heated air to the goods contained in the container is accomplished both by the passage of air over the top of the stored goods as well as through the interior shell.

In another embodiment of the invention, the climate control device may include a fluid heat pump which is fluidly connected to a grid formed of tubing which passes through the passage. In this case, transfer of thermal potential from the climate control device to the goods in the container is effected by means of conduction through the interior shell and the goods.

The container for transport and storage of goods may also include a self-unloading apparatus operatively connected to the container for unloading the goods. The self-unloading apparatus may be configured as a conveyor, a dump bed, or a movable or reciprocating floor.

In one embodiment of the invention, the container for transport and storage of goods is configured as a transport trailer including an interior shell having a generally "V" shaped configuration including a floor section, a first sloping wall section attached to and extending from the floor section, and a second sloping wall section attached to and extending from the floor section. This embodiment of the invention may also include a first generally upright wall section attached to and extending from the first sloping wall section, and a second generally upright wall section attached to and extending from the second sloping wall section.

In one embodiment of the invention, the container for transport and storage of goods is configured as a transport trailer including a frame supported by and transportable upon a wheel assembly. The frame supports an exterior support shell to which a plurality of support members are attached. An interior shell is attached to and supported by the support members and offset from the exterior support shell forming a passage between the exterior support shell and the interior shell. A front bulkhead is attached to the front portion of the trailer, and a rear bulkhead, in the form of a pivotal gate, is attached to the rear portion of the trailer.

The present invention may also include a top enclosure. The top enclosure member may be configured as an attached panel, as a removable panel or as a removable panel. The top enclosure member may be configured as an insulated or an uninsulated member. The invention may also include an enclosure member configured as an insulated tarp for covering the container.

A self-unloading apparatus is operatively connected to the container for unloading the goods. The self-unloading apparatus may be configured as a conveyor, a dump bed, or a movable or reciprocating floor. In this embodiment of the invention, the transport trailer also includes a climate control device pneumatically connected to the passage for effecting a transfer of a thermal potential from the climate control device through the passage and through the interior shell, and for transferring the thermal potential to and through the goods contained within the container for maintaining the goods within a predetermined temperature range during transport and storage.

Other advantages will become apparent to those skilled in the art from the following detailed description read in conjunction with the appended claims.

It should be understood that the referenced drawings are not to scale and are intended as representations. The drawings are not necessarily intended to depict the functional and structural details of the invention, which can be determined by one of skill in the art by examination of the descriptions and claims provided herein.

DETAILED DESCRIPTION OF THE INVENTION

Figure 1:
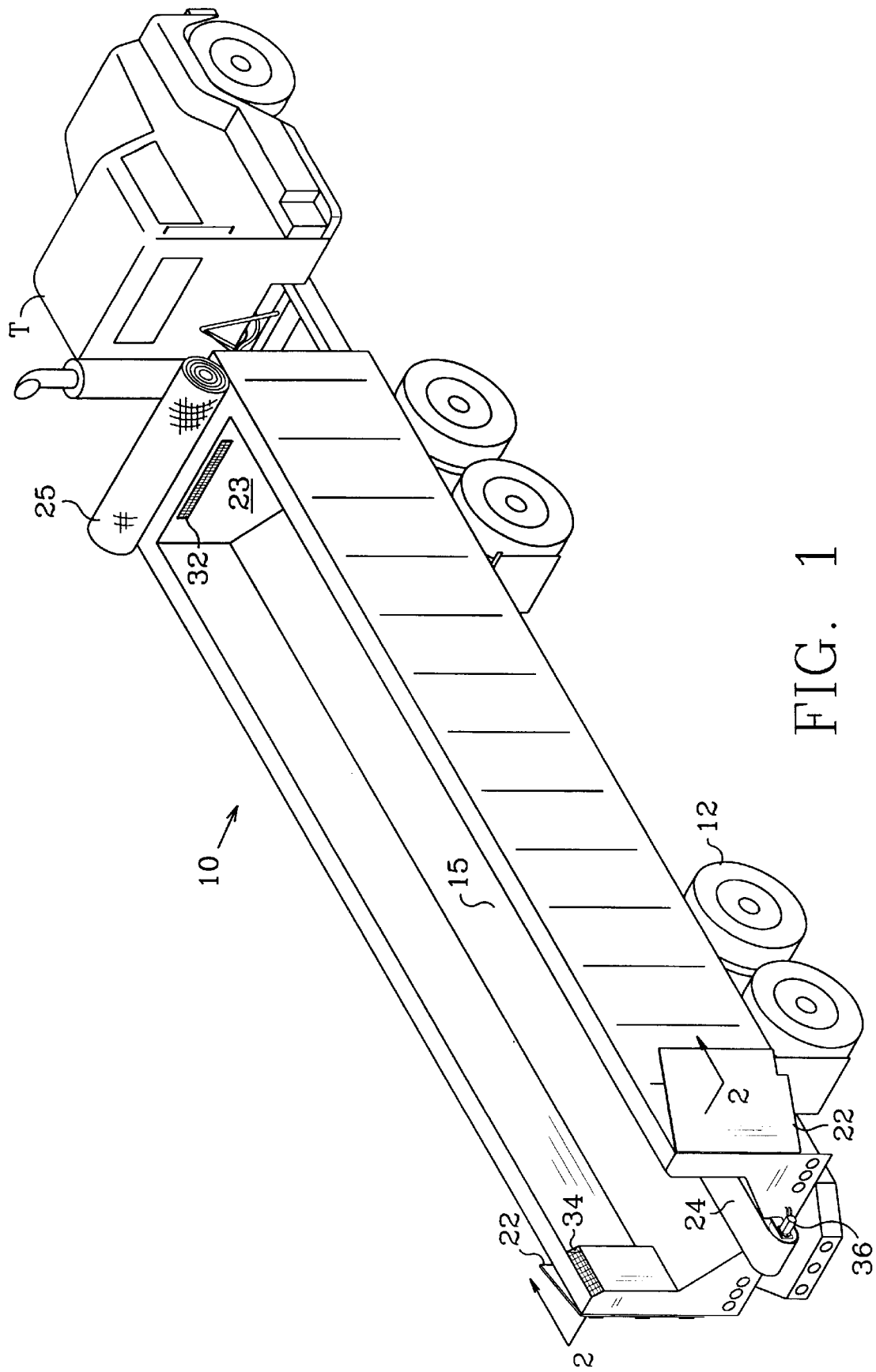
FIG. 1 is a perspective representational view of a transport trailer including the present invention.

Referring now to FIG. 1, a transport and storage container according to the present invention is shown. In this case, transport and storage container is configured as a trailer 10 which is removably attachable to tractor T for transport. Trailer 10 includes a plurality of wheel assemblies 12 for facilitating transport of trailer 10.

FIG. 1 also shows trailer 10 including interior shell 15. Conveyor 24 extends along the bottom portion of interior shell 15. Trailer 10 also includes front bulkhead 23 and a pair of rear gates 22 which are pivotally attached to the rear of trailer 10 for closing off the rear portion of interior shell 15.

FIG. 1 also shows forced air heating vent 32 located near the front end of trailer 10 and intake 34 located near the rear of trailer 10.

Trailer 10 is also shown in FIG. 1 including tarp 25, which is depicted herein in a rolled-up position.

FIG. 1 also shows hydraulic drive 36 which provides power to conveyer 24 for self-unloading trailer 10.

Figure 2:
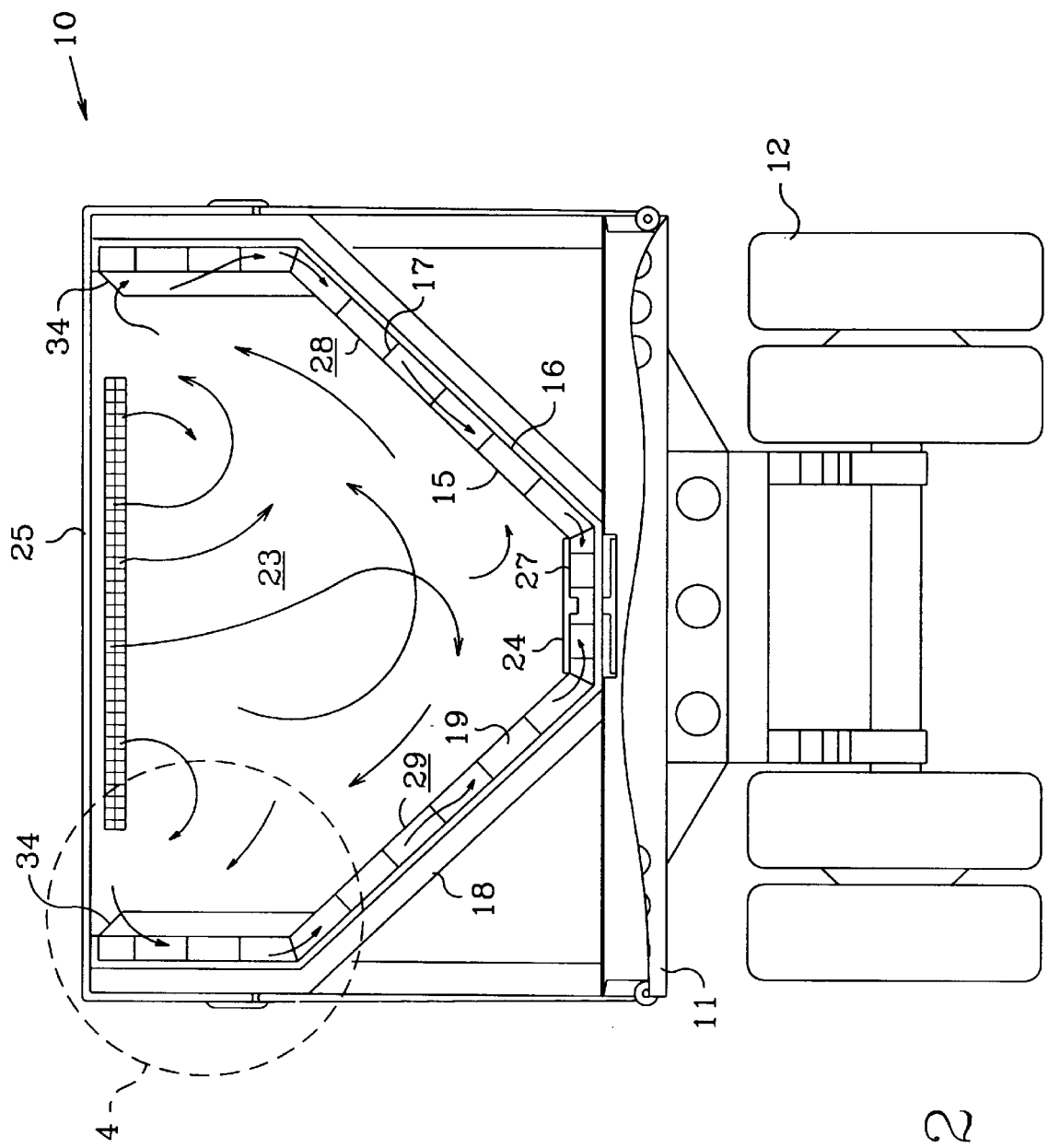
FIG. 2 is a rear cutaway representational view of a transport trailer including the present invention.

Referring to FIG. 2, trailer 10 is shown including wheel assemblies 12 attached to frame 11. Shelf support frame 18 is attached to and extends from trailer 11 for supporting the sandwiched shell wall construction of the transport and storage container. Specifically, exterior support shell 16 is attached to and is supported directly by shell support 18. A plurality of support members 17 are attached to and extend from the upper side of exterior support shell 16. Interior load container shell 15 is attached to and supported by the plurality of support members 17 forming a load containing surface. The arrangement of exterior support shell 16 and interior shell 15, in relationship to one another, forms passage 19 located between interior shell 15 and exterior support shell 16.

FIG. 2 also shows forced air heating vent 32 located on front bulk-head 23. Heated air is indicated by the arrows in FIG. 2, and travels from forced air heating vent 32 across and through the interior compartment of trailer 10 formed by the interior portion of interior load containing shell 15.

FIG. 2 also shows a pair of intake ports 34, one located at either side of interior shell 15.

In the embodiment depicted in FIG. 2, interior shell 15 includes floor section 27. First sloping wall section 28 and second sloping wall section 29 are attached to and extend from floor section 27. Also as shown in FIG. 2 is conveyor 24 which extends across floor section 27. Tarp 25 is shown drawn across the top opening of trailer 10.

Figure 3:
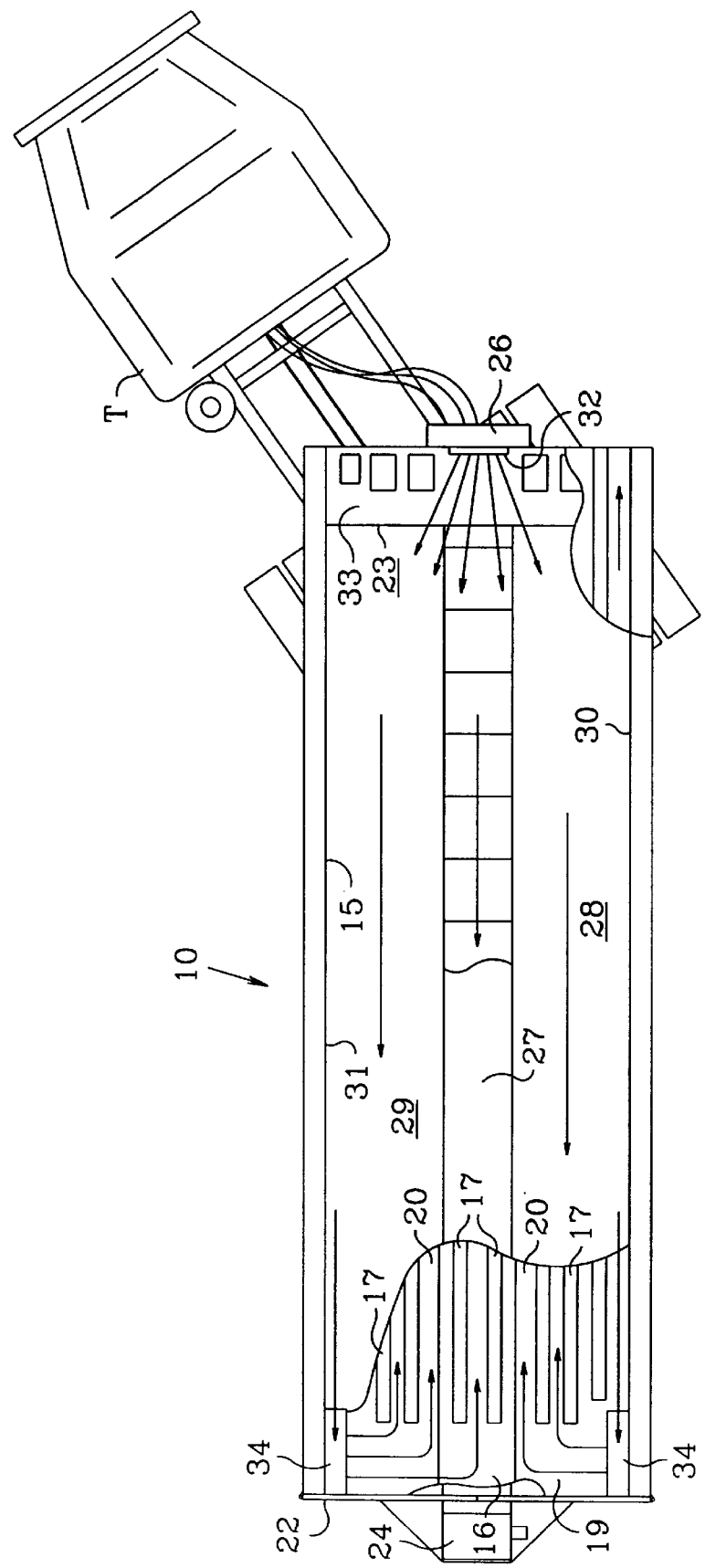
FIG. 3 is a top cutaway representational view of a transport trailer including the present invention.

Referring to FIG. 3, trailer 10 is shown attached to tractor T. Trailer 10 includes interior shell 15 having first sloping wall section 28 and second sloping wall section 29 attached to and extending from floor section 27. First vertical wall section 30 and second vertical wall section 31 are attached to and extend from first sloping wall section 28 and second sloping wall section 29, respectively. Front bulk-head 23 is shown located near the front of end of trailer 10.

Forced air heating unit 26 is attached to the front end of trailer 10 and heated air is discharged through forced air heating vent 32 into the interior portion of trailer 10. Heated air travels through the interior portion of trailer 10 and is drawn into intakes 34 where it is drawn between exterior support shell 16 and interior load container shell 15 within passage 19. Passage 19 is shown divided into a plurality of adjacent ducts 20, which are formed between support members 17, exterior support shelf 16 and interior load container shell 15. Heated air moves under interior load container shell 15 and is drawn into air collection plenum 33 located near the front end of trailer 10, where it is recycled back through forced air heating unit 26. FIG. 3 also shows conveyor 24 extending from the rear end of trailer 10 beyond rear gates 22.

Figure 4:
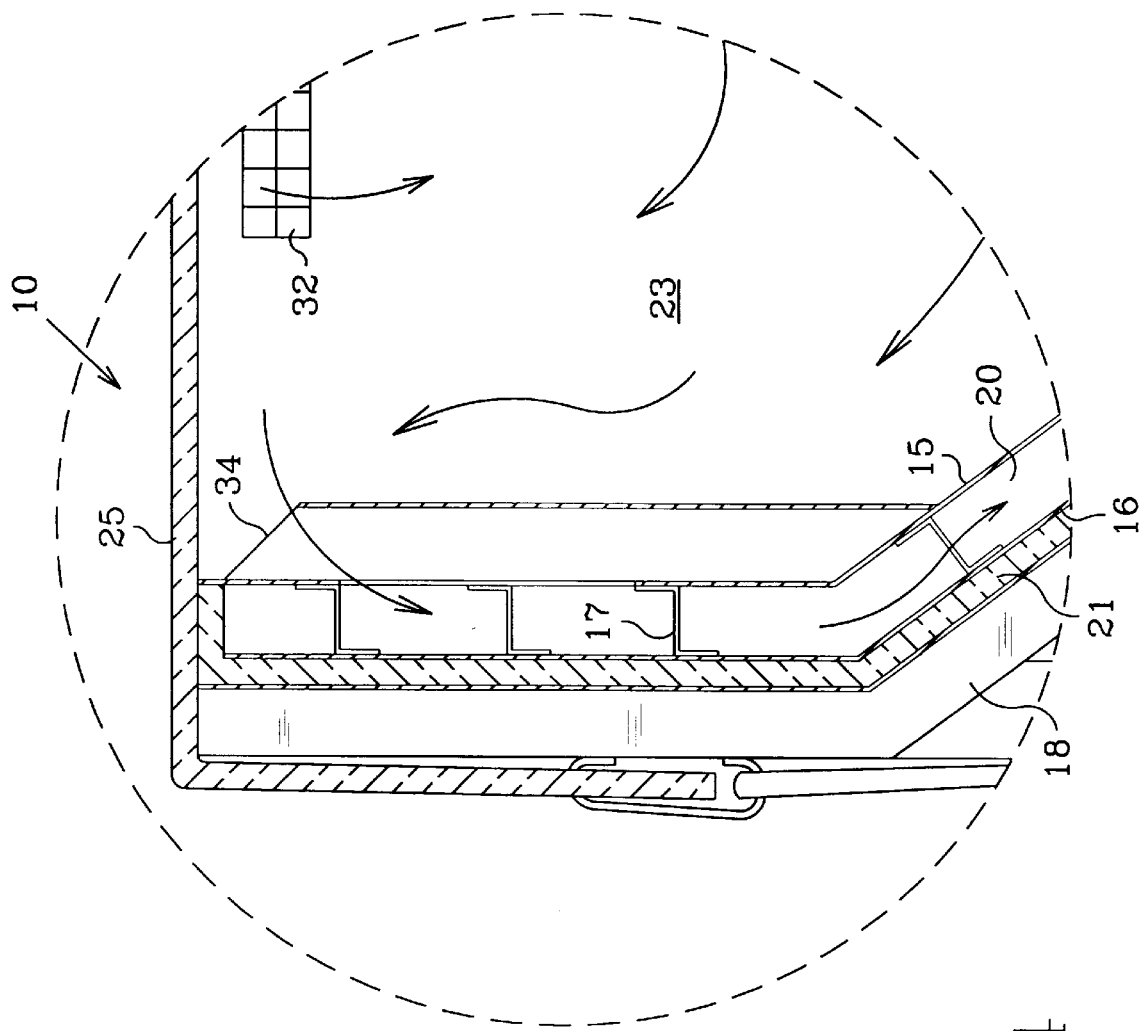
FIG. 4 is a rear cutaway representational detail of a transport trailer including the present invention.

Referring to FIG. 4, a detail of the sandwiched construction of trailer 10 is shown. Specifically, the detail depicts exterior support shell 16 attached to and supported by shell support frame 18. Insulation 21 is shown attached to the outer surface of exterior support shell 16. Also shown in FIG. 4 are a plurality of support members 17 which are attached to and extend from exterior support shell 16. The combination of the exterior support shell 16, the interior shell 15 and the plurality of support members 17 creates a plurality of adjacent ducts 20.

FIG. 4 also shows tarp 25 drawn across the top of trailer 10. Forced air heating vent 32 is shown located on the face of front bulk head 23 and intake 34 is located near the rear of trailer 10.

Figure 5:
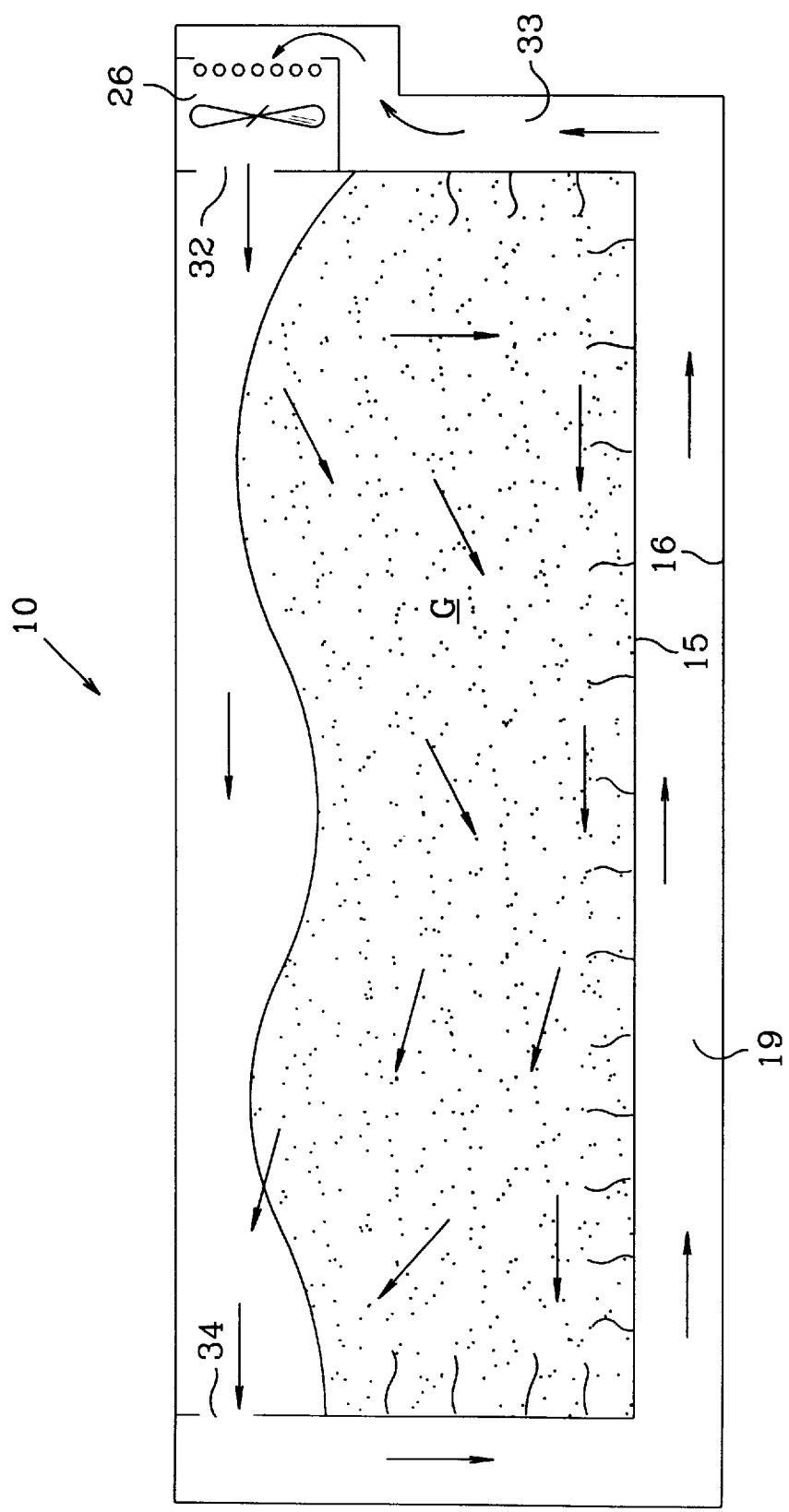
FIG. 5 is a side schematic representational view of a transport trailer including the present invention.

FIG. 5 is a schematic representation side view depicting the flow of conditioned air from a climate control device, in this case forced air heating unit 26, through forced air heating vent 32 into container 10. Conditioned air travels across the top surface of the goods G container within container 10 being drawn through intake 34 located near the rear of trailer 10. The conditioned air then travels through passage 19 between interior load container shell 15 and exterior support shell 16, returning eventually to air collection plenum 33 to be recirculated through forced air heating unit 26. In this manner, conditioned air, and therefore a thermal potential is efficiently directed to all sides of goods G contained in trailer 10. In this case, heat is transferred to and through the goods both by passing above goods G contained in trailer 10 as depicted by the flow lines in FIG. 5, and by conduction through interior shell 15 and radiation from interior shell 15 to goods G as depicted by the wavy lines in FIG. 5.

While this invention has been described with reference to the described embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

I claim:

1. A container for transport and storage of goods comprising:
   an exterior support shell;
   a plurality of support members attached to and extending from an upper surface of the exterior support shell;
   an interior shell configured to have an interior load containing cavity attached to and supported by the support members and offset from the exterior support shell forming a passage between the exterior support shell and the structural wall;
   a self-unloading apparatus operatively connected to the container for unloading the goods;
   an enclosure member covering the container; and
   a climate control device pneumatically connected to the passage and the container for transferring a thermal potential from the climate control device through the passage and through the interior load containing cavity of the interior shell transferring the thermal potential to and through the goods contained in the container for maintaining the goods within a predetermined temperature range.

2. The container for transport and storage of goods of claim 1 wherein the interior shell further comprises:
   a floor section;
   a first sloping wall section attached to and extending from a first edge of the floor section;
   a second sloping wall section attached to and extending from a second edge of the floor section;
   a front bulkhead attached to a front edge of the container; and
   a rear bulkhead attached to a rear end of the container.

3. The container for transport and storage of goods of claim 1 further comprising an insulating layer attached to the exterior support shell.

4. The container for transport and storage of goods of claim 1 wherein the climate control device further comprises:
   an air circulation system pneumatically connected to the climate control device for circulating air from the climate control device through the passage; and
   an intake port for conducting air flow from the interior load containing cavity of the container to the passage.

5. The container for transport and storage of goods of claim 4 wherein the climate control device further comprises a forced air heating unit.

6. The container for transport and storage of goods of claim 4 wherein the climate control device further comprises a forced air cooling unit.

7. The container for transport and storage of goods of claim 1 wherein support members are configured so as to divide the passage into a plurality of adjacent ducts.

8. The container for transport and storage of goods of claim 4 wherein the climate control device further comprises an air collection plenum pneumatically connected to the climate control device and the passage.

9. The container for transport and storage of goods of claim 7 wherein the climate control device further comprises an air flow diversion mechanism for diverting conditioned air from the interior of the container to a preselected duct.

10. The container for transport and storage of goods of claim 9 further comprising a temperature sensing device positioned within the preselected duct and operatively connected to the air flow diversion mechanism for diverting conditioned air to the preselected duct wherein the temperature is outside the predetermined temperature range.

11. The container for transport and storage of goods of claim 1 the top further comprising a removable enclosure member.

12. A transport trailer including a container for goods comprising:
   a frame;
   a conveyance member attached to the frame for facilitating conveyance of the trailer;
   an exterior support shell attached to and supported by the trailer frame;
   a plurality of support members attached to and extending from an upper surface of the exterior support shell;

an interior shell attached to and supported by the support members and offset from the exterior support shell forming a passage between the exterior support shell and the structural wall;

a front bulkhead attached to and extending from the interior shell;

a rear bulkhead attached to and extending from the interior shell;

a self-unloading apparatus operatively connected to the container for unloading the goods;

an enclosure member covering the container; and a climate control device pneumatically connected to the passage for effecting a transfer of a thermal potential from the climate control device through the passage and through the interior load containing cavity of the interior shell, for transferring the thermal potential to and through the goods contained within the container for maintaining the goods within a predetermined temperature range.

13. The container for transport and storage of goods of claim 12 further comprising an insulating layer attached to the exterior support shell.

14. The container for transport and storage of goods of claim 12 wherein the climate control device further comprises:

an air circulation system pneumatically connected to the climate control device for circulating air from the climate control device through the passage; and an intake port for conducting air flow from the interior load containing cavity of the interior shell to the passage.

15. The container for transport and storage of goods of claim 14 wherein the climate control device further comprises a forced air heating unit.

16. The container for transport and storage of goods of claim 14 wherein the climate control device further comprises a forced air cooling unit.

17. The container for transport and storage of goods of claim 12 wherein support members are configured so as to divide the passage in a plurality of adjacent ducts.

18. The container for transport and storage of goods of claim 14 wherein the climate control device further comprises an air collection plenum pneumatically connected to the climate control device and the passage.

19. The container for transport and storage of goods of claim 17 wherein the climate control device further comprises an air flow diversion mechanism for diverting conditioned air from the interior load containing cavity of the interior shell to a preselected duct.

20. The container for transport and storage of goods of claim 19 further comprising a temperature sensing device positioned within the preselected duct and operatively connected to the air flow diversion mechanism for diverting conditioned air to the preselected duct wherein the temperature is outside the predetermined temperature range.

* * * * *

UNITED STATES PATENT AND TRADEMARK OFFICE
CERTIFICATE OF CORRECTION

PATENT NO. : 6,007,419
DATED : December 28, 1999
INVENTOR(S) : Kevan G Bessire

It is certified that error appears in the above-identified patent and that said Letters Patent is hereby corrected as shown below:

On the title page at item number 76, the inventor's name should read as "Kevan G Bessire".

Signed and Sealed this

Twenty-fourth Day of October, 2000

Attest:

Q. TODD DICKINSON

*Attesting Officer*      *Director of Patents and Trademarks*